(12) United States Patent
Fang et al.

(10) Patent No.: US 10,443,285 B2
(45) Date of Patent: Oct. 15, 2019

(54) DAMPING HINGE

(71) Applicant: Foxlink Image Technology Co., Ltd., New Taipei (TW)

(72) Inventors: Jing Hua Fang, New Taipei (TW); Pei Chun Lu, New Taipei (TW)

(73) Assignee: Foxlink Image Technology Co., Ltd., New Taipei (TW)

( * ) Notice: Subject to any disclaimer, the term of this patent is extended or adjusted under 35 U.S.C. 154(b) by 0 days.

(21) Appl. No.: 16/192,831

(22) Filed: Nov. 16, 2018

(65) Prior Publication Data

US 2019/0203516 A1    Jul. 4, 2019

(30) Foreign Application Priority Data

Dec. 28, 2017   (TW) ............................. 106219351 U (51) Int. Cl.
```
E05F 1/08      (2006.01)
E05F 3/20      (2006.01)
E05D 3/02      (2006.01)
E05D 11/00     (2006.01)
```
(Continued)

(52) U.S. Cl.
CPC .................. *E05F 3/20* (2013.01); *E05D 3/02* (2013.01); *E05D 11/00* (2013.01); *E05D 11/06* (2013.01); *E05Y 2201/212* (2013.01); *E05Y 2900/60* (2013.01); *H04N 1/00554* (2013.01)

(58) Field of Classification Search
CPC .......... Y10T 16/5323; Y10T 16/53834; Y10T 16/53885; Y10T 16/5406; Y10T 16/543; Y10T 16/5448; Y10T 16/5383; H04N 1/00; H04N 1/00543; H04N 1/00554; H04N 1/00519; H04N 2201/0422; E05Y 2900/608; E05Y 2900/606; E05Y 2900/60; E05Y 2201/212; G03G 15/605; G03B 27/62; G03B 27/6228; E05D 3/18; E05D 3/20; E05D 3/02; E05D 7/04; E05D 7/12; E05D 11/1064; E05D 11/00; E05D 11/06

See application file for complete search history.

(56) References Cited

U.S. PATENT DOCUMENTS 4,660,251 A * 4/1987 Watabe ..................... E05D 7/04
                                                              16/289
4,730,364 A * 3/1988 Tat-Kee .............. E05D 11/1064
                                                              16/337

(Continued)

*Primary Examiner* — Chuck Y Mah
(74) *Attorney, Agent, or Firm* — Lin & Associates Intellectual Property, Inc.

(57) ABSTRACT

A damping hinge includes a first joining part; a revolving part pivotably connected to the first joining part and being capable of revolving among a first position, a second position and a third position; a supporting module arranged within the first joining part for pressing the revolving part to keep the revolving part and the first joining part staying in a relative position; a second joining part fastened to the revolving part for connecting the upper cover; a first enforcement frame arranged on the first joining part; and a damping module including a damper holder pivotably connected to the second joining part, a damper consisting of a damper core fastened on the damper holder as a fixed end and an actuating portion as a free end being able to move up and down, a damper spring connected between the second joining part and the damper holder.

8 Claims, 9 Drawing Sheets

(51) Int. Cl.
*E05D 11/06* (2006.01)
*H04N 1/00* (2006.01)

(56) References Cited

U.S. PATENT DOCUMENTS

| | | | | |
|---|---|---|---|---|
| 4,853,750 A * | 8/1989 | Murata | ............. | G03B 27/6228 355/75 |
| 6,629,336 B2 * | 10/2003 | Hosaka | ................ | E05F 1/1261 16/284 |
| 6,684,456 B2 * | 2/2004 | Lee | .................... | E05D 11/1064 16/286 |
| 6,928,698 B2 * | 8/2005 | Chen | ......................... | E05D 3/18 16/277 |
| 7,069,622 B2 * | 7/2006 | Ohara | .................... | B41J 29/13 16/286 |
| 7,418,766 B2 * | 9/2008 | Nelson | ............... | E05D 11/1007 16/239 |
| 7,617,568 B2 * | 11/2009 | Jing | ...................... | E05F 1/1276 16/239 |
| 7,894,748 B2 * | 2/2011 | Su | ....................... | H04N 1/00554 399/125 |
| 7,949,292 B2 * | 5/2011 | Choi | .................. | H04N 1/00519 399/380 |
| 8,457,527 B2 * | 6/2013 | Takata | ................. | G03G 15/605 16/286 |
| 8,565,662 B2 * | 10/2013 | Choi | .................. | H04N 1/00519 399/377 |
| 8,925,154 B2 * | 1/2015 | Ergun | .................... | H01H 85/24 16/342 |
| 9,203,995 B2 * | 12/2015 | Muraoka | ............ | H04N 1/00554 |
| 2004/0032578 A1 * | 2/2004 | Chen | ....................... | G03B 27/62 355/75 |
| 2007/0089271 A1 * | 4/2007 | Jo | ........................ | E05D 11/1064 16/286 |
| 2007/0251056 A1 * | 11/2007 | Aoyagi | ................. | G03G 15/60 16/221 |

* cited by examiner

DAMPING HINGE

BACKGROUND OF THE INVENTION

1. Field of the Invention

This invention relates to a hinge, particularly a damping hinge.

2. The Related Art

The scanner, copier, printer and the fax machine are widely used in a modern office, and each of them has a hinge and a damper that holds the upper cover and the main body of the machine together. Said hinge mainly comes in two types, the plastic hinge with a spring and the iron casting hinge. Limited to the structure strength, the plastic hinge mostly lacks of an internal damper and needs to assemble with an external damper, and thus it is commonly used in low-end products. On the other hand, the iron casting hinge is made of iron parts and being secured with rivets, so it has larger inner space for assembling an inner damper and better structure strength. Therefore, the iron casting hinge can be used in both high-end and low-end products, but it also has some disadvantages such as being expensive in production cost, larger in size and heavier in its weight.

Therefore, a conventional hinge needs extra space to assemble due to its size, more expensive in production cost and heavier in its weight.

SUMMARY OF THE INVENTION

The objective of the present invention is to provide a damping hinge to overcome the lack and defects in the conventional hinge.

To achieve said objective, the damping hinge in this invention is provided for interconnecting a scanner and an upper cover thereof. The damping hinge includes a first joining part, a revolving part, a supporting module, a second joining part, a damping module and a first enforcement frame; the revolving part being pivotably connected to the first joining part and being capable of revolving among a first position, a second position and a third position; the supporting module being arranged within the first joining part for pressing the revolving part to keep the revolving part and the first joining part staying in a relative position; the second joining part being fastened to the revolving part for connecting the upper cover; the damping module including a damper, a damper holder and a damper spring; the damper comprising a damper core and an actuating portion, the damper core being fastened on the damper holder as a fixed end, and the actuating portion, as a free end being able to move up and down freely; the damper holder being pivotably connected to the second joining part and the damper spring being connected between the second joining part and the damper holder; the first enforcement frame being arranged on the first joining part; wherein while the revolving part is rotating from the first position to the second position, the first enforcement frame is not engaging with the actuating portion, thus the damping module is not resisting the motion of the revolving part; but while the revolving part is rotating from the second position to the third position, the first enforcement frame is engaging with the actuating portion, and thus the damping module will resist the motion of the revolving part.

As described above, in the operation process of the damping hinge in this invention, during the time that the revolving part rotates between the first and the second positions, the engaging portion of the first enforcement frame is not contacting with the actuating portion and thus the motion of the revolving part is undamped; and during the time that the revolving part rotates between the second and the third positions, the engaging portion of the first enforcement frame pressing the actuating portion continuously to damp the motion of the revolving part. Therefore, the damping hinge in this invention has an inner damper to reduce the size and the production cost.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

In order to describe the technical contents, structural features, purpose to be achieved and the effectiveness of the present invention, the detailed description is given with schema below.

Figure 1:
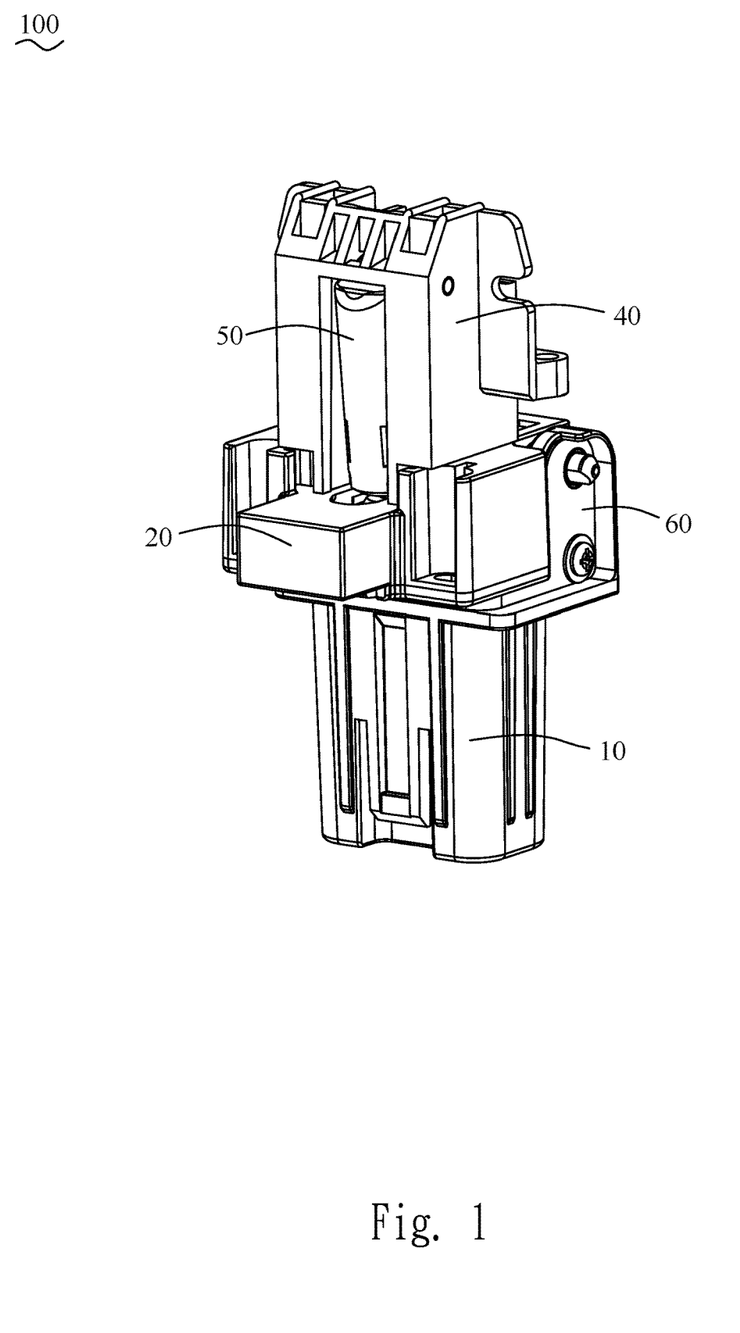
FIG. 1 shows a perspective view of the damping hinge in a preferred embodiment.
Figure 2:
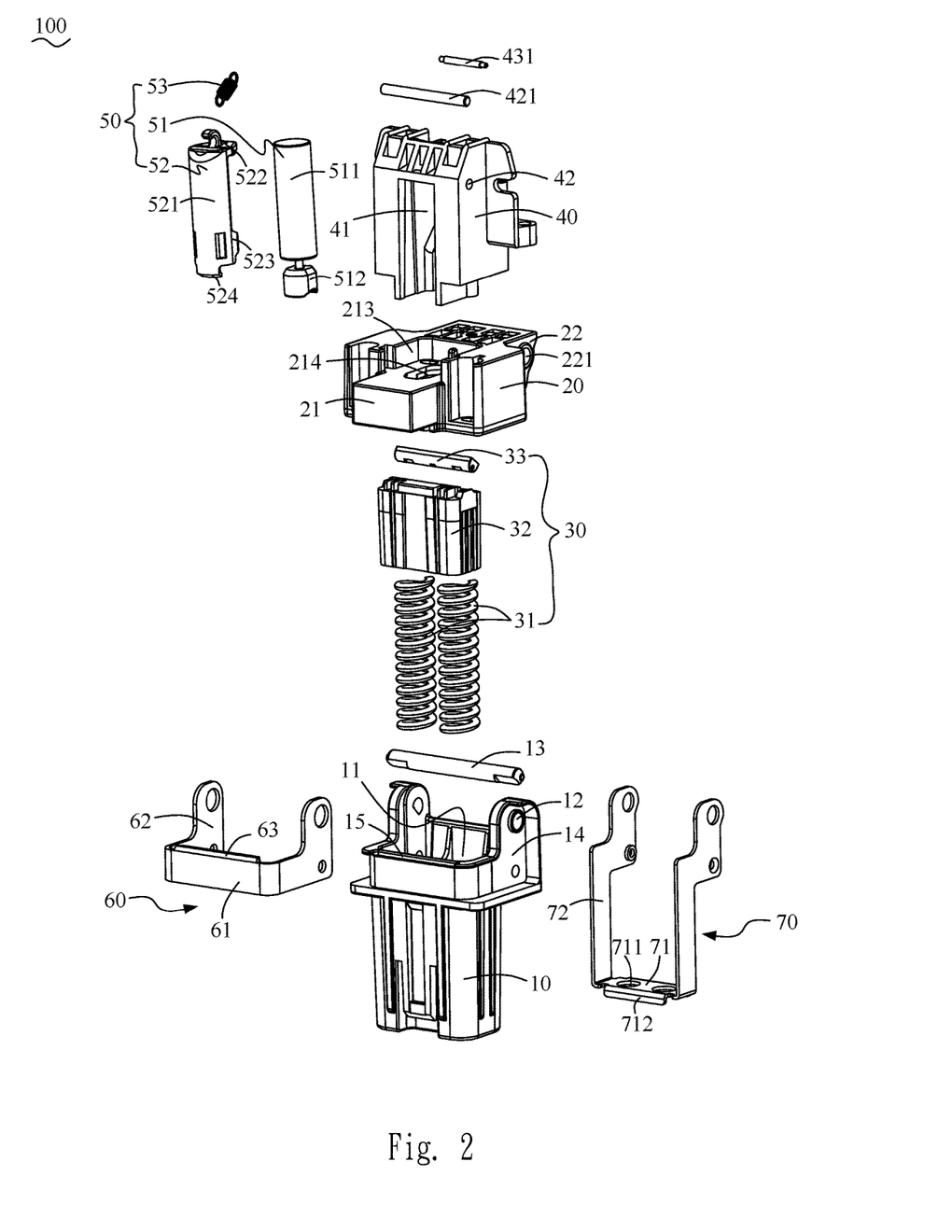
FIG. 2 shows an exploded view of the damping hinge shown in FIG. 1.

Referring to FIG. 1 and FIG. 2, the damping hinge 100 in the present invention is designed for being used in a scanner (not shown) which mainly consists of a scanner body (not shown) and an upper cover (not shown) being free to swing open and close to the scanner body. The damping hinge 100 comprises a first joining part 10, a revolving part 20, a supporting module 30, a second joining part 40, a damping module 50 and a first enforcement frame 60.

Figure 3:
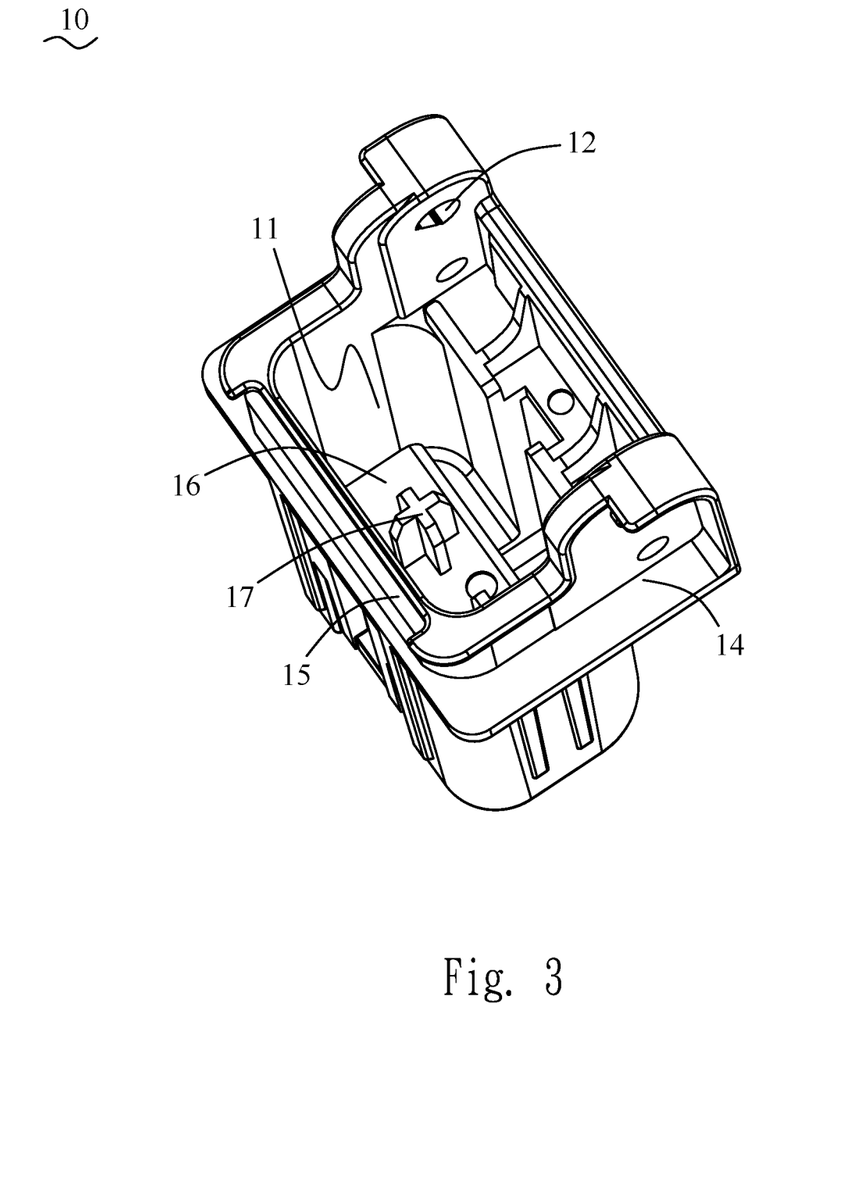
FIG. 3 shows a perspective view of the first joining part in the present invention.

Referring to FIG. 2 and FIG. 3, The first joining part 10 comprises an accommodating space 11 and two first revolving holes 12 located on one side surface of the upper portion of the first joining part 10 for holding a revolving pin 13 within. The side surface of the upper portion of the first joining part 10 further comprises a first holding notch 14 and a second holding notch 15, and the inner space 11 has an extruding platform 16 with two extruding pillars 17 arranged on the bottom surface of the inner space 11.

Figure 4:
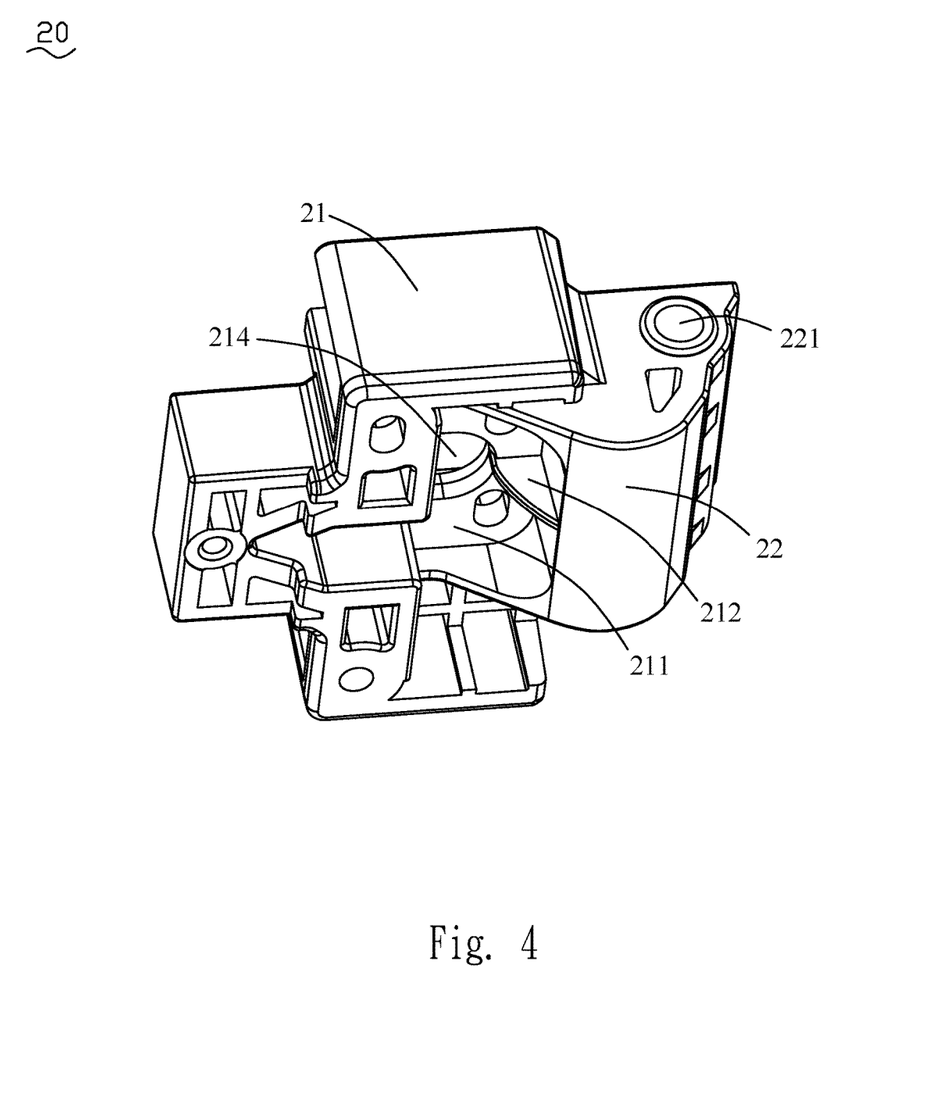
FIG. 4 shows a perspective view of the revolving part in the present invention.

Referring to FIG. 2 and FIG. 4 now, the revolving part 20 is pivotally assembled to the first joining part 10, and the revolving part 20 is capable of resolving around the first joining part 10 and swinging to a first position, a second position and a third position. Specifically, the revolving part 20 comprises a part body 21 and a curve portion 22 extended from the rear end of the part body 21, the part body 21 has a first notch 211 located on the bottom surface, and the first notch 211 extends upward and has a contacting portion 212 located on the mid-section of the side wall of the first notch 211, a second notch 213 is arranged on the upper surface of the part body 21 and the second notch 213 has an opening 214 extended forward for connecting with the first notch 211, the curve portion 22 has a curved bottom and a second revolving hole 221 to hold the revolving pin 13 within for pivotally joining the revolving part 20 and the first joining part 10.

Referring to FIG. 2, the supporting module 30 is arranged within the first joining part 10 to push the revolving part 20 with elastic force and keep the revolving part 20 and the first joining part 10 in relative position. The supporting module 30 includes a supporting spring 31 disposed within the inner space 11, a supporting body 32 having a supporting spring holder (not shown) arranged on the bottom for assembling with the supporting spring 31 and a supporting groove 321 (shown in FIG. 8) arranged on the top for assembling with a supporting pad 33, and the supporting spring 31 pushes the supporting body 32 upward to engage the curve portion 22 with the supporting pad 33.

Figure 5:
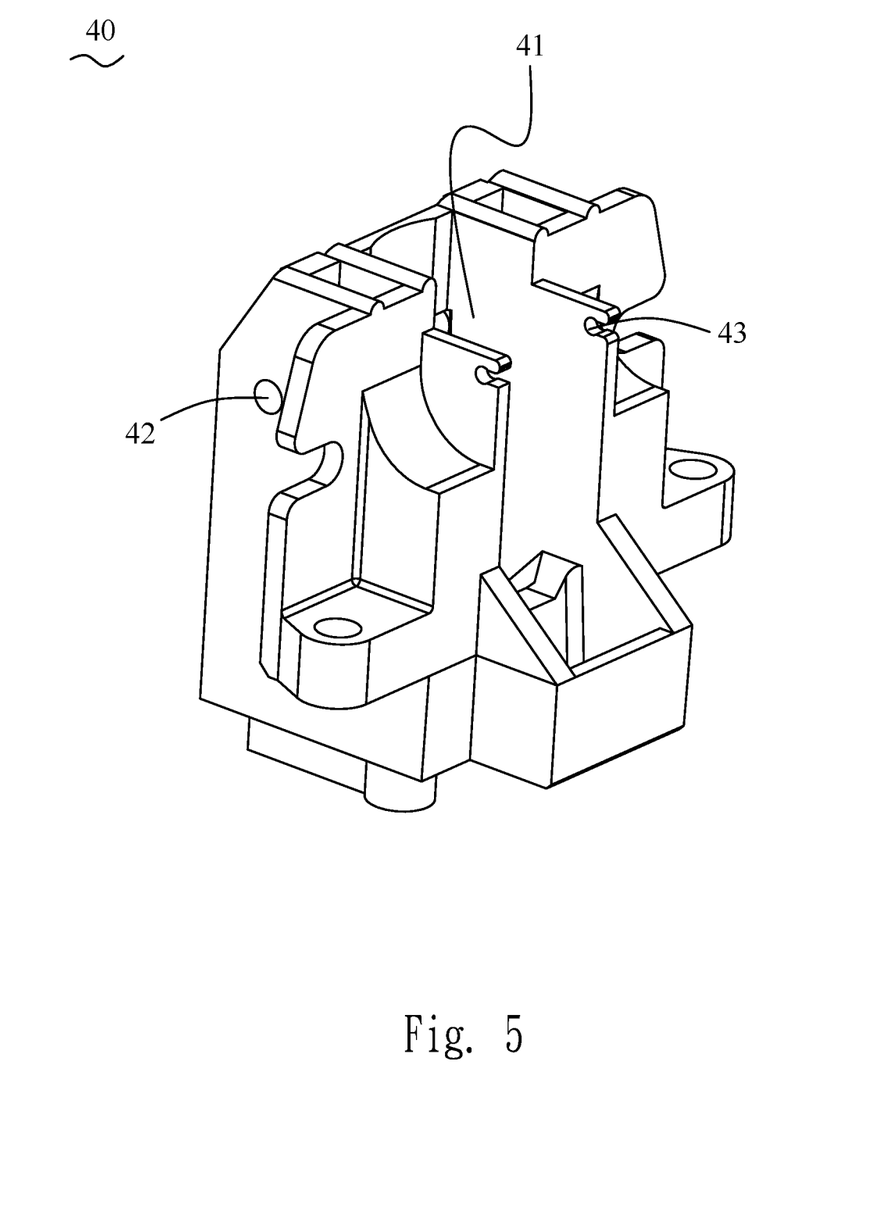
FIG. 5 shows a perspective view of the second joining part in the present invention.

Referring to FIG. 2 and FIG. 5, the second joining part 40 is fastened on the revolving part 20 to connect the upper cover, and the second joining part 40 comprises an accommodating space 41 extended vertically. In specific, the second joining part 40 is bolted to the revolving part 20 to fit the bottom portion of the second joining part 40 in the second notch 213. A pair of first fixing holes 42 are disposed on one side surface of the front end of the upper portion of the accommodating space 41 respectively to hold a first fixing pin 421, and a pair of second fixing holes 43 are disposed on the side surface of the rear end of the upper portion of the accommodating space 41 respectively to hold a second fixing pin 431.

Figure 6:
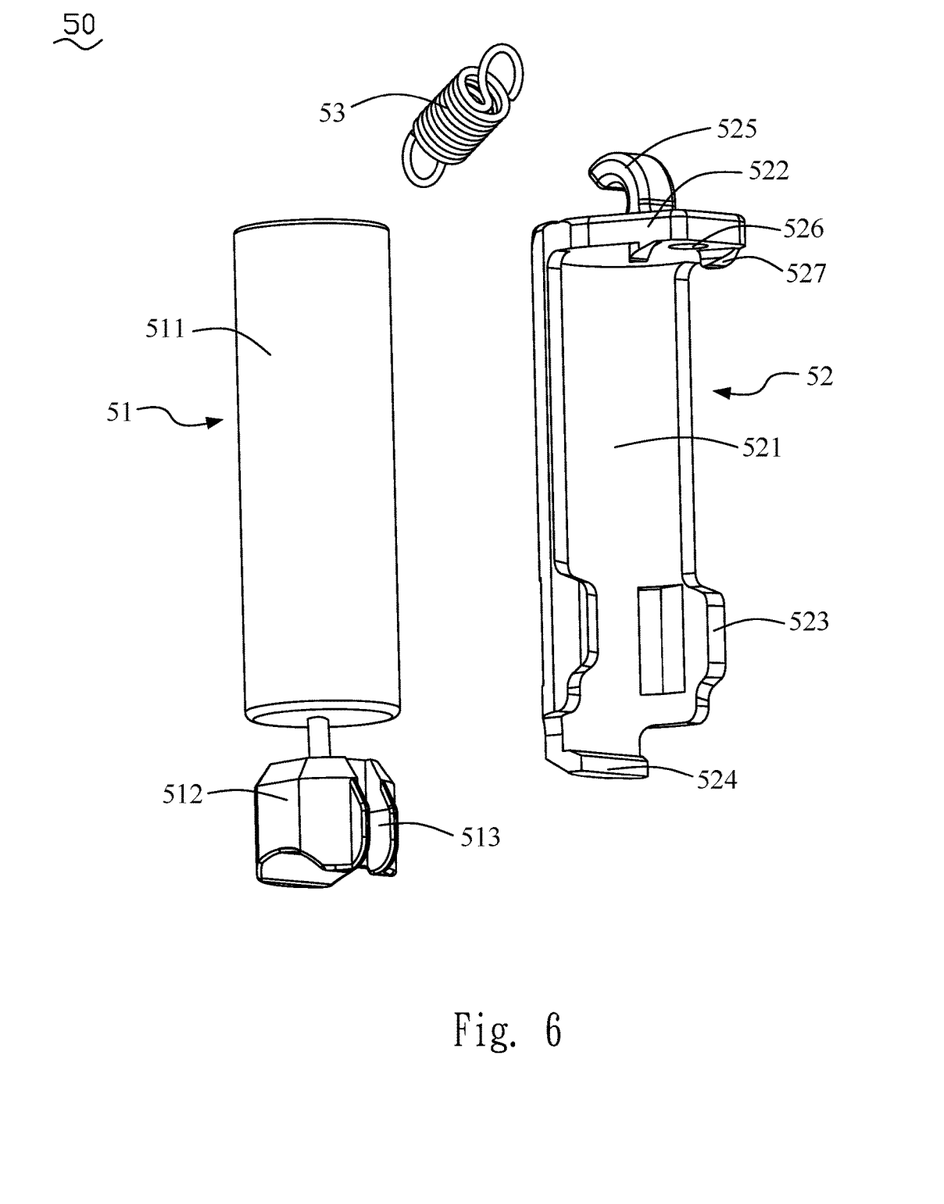
FIG. 6 shows a perspective view of the damping module in the present invention.

Referring to FIG. 2 and FIG. 6, the damping module 50 is arranged in the accommodating space 41 and comprises a damper 51, a damper holder 52 and a damper spring 53. The damper 51 comprises a damper core 511 fastened to the damper holder 52 and an actuating portion 512 which is capable of applying pressing force elastically. The damper holder 52 is pivotally connected to the second joining part 40, and one end of the damper spring 53 is connected to the second joining part 40 and the other end of the damper spring 53 is connected to the top of the damper holder 52. Specifically, a contacting groove 513 is disposed on the rear end of the actuating portion 512 and the contacting portion 212 is free to swing in or out of the contacting groove 513. The damper holder 52 comprises a holder body 521 and a connecting portion 522 extended backward from the top end of the holder body 521. The holder body 521 further comprises a first holding portion 523 extended outward and backward from the bottom portion of the holder body 521, a second holding portion 524 extended backward from the bottom portion of the holder body 521, and a hook 525 disposed at the mid portion of the top of the connecting portion 522, a connecting hole 526 is disposed on the rear end of the connecting portion 522, a third holding portion 527 is formed at rear end of the bottom portion of the connecting portion 522. The hook 525 is hooked on the first fixing pin 421, one end of the damper spring 53 is hooked on the second fixing pin 431 and the other end is hooked on the connecting hole 526; the damper core 511 is fastened on the damper holder 52 by the first holding portion 523, second holding portion 524 and the third holding portion 527.

Referring to FIG. 2, the first enforcement frame 60 is fastened on the first joining part 10. In the present embodiment, the first enforcement frame 60 is made of metal and comprises a basement 61, two extending portion 62 extended from both end of the basement 61 and bent upward, and an engaging portion 63 extended backward from the upper portion of the basement 61. The basement 61 and the extending portion 62 are bolted in the first holding notch 14 and the engaging portion 63 is disposed in the second holding notch 15.

Figure 7:
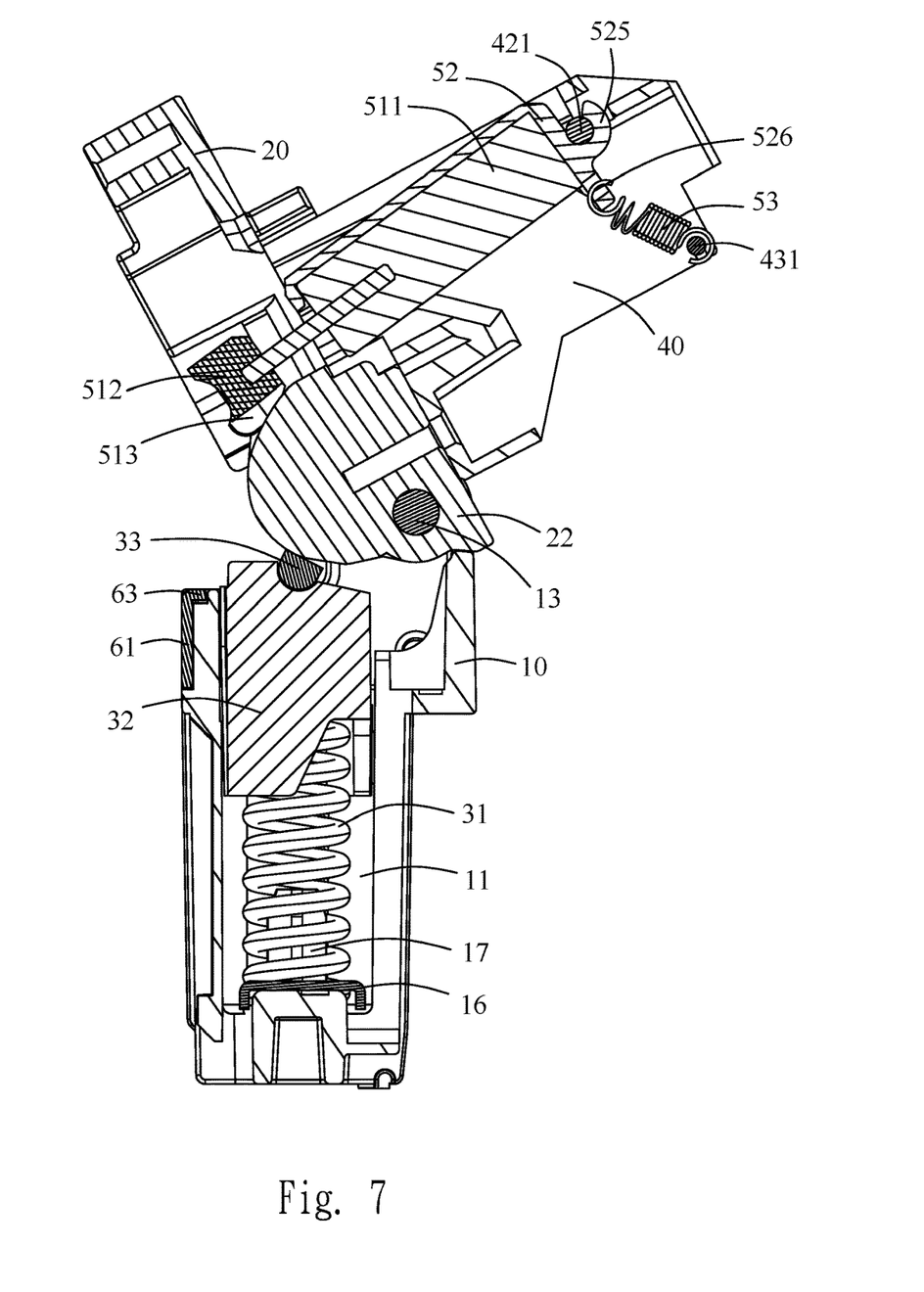
FIG. 7 shows a sectional view of the damping hinge in the first position.
Figure 8:
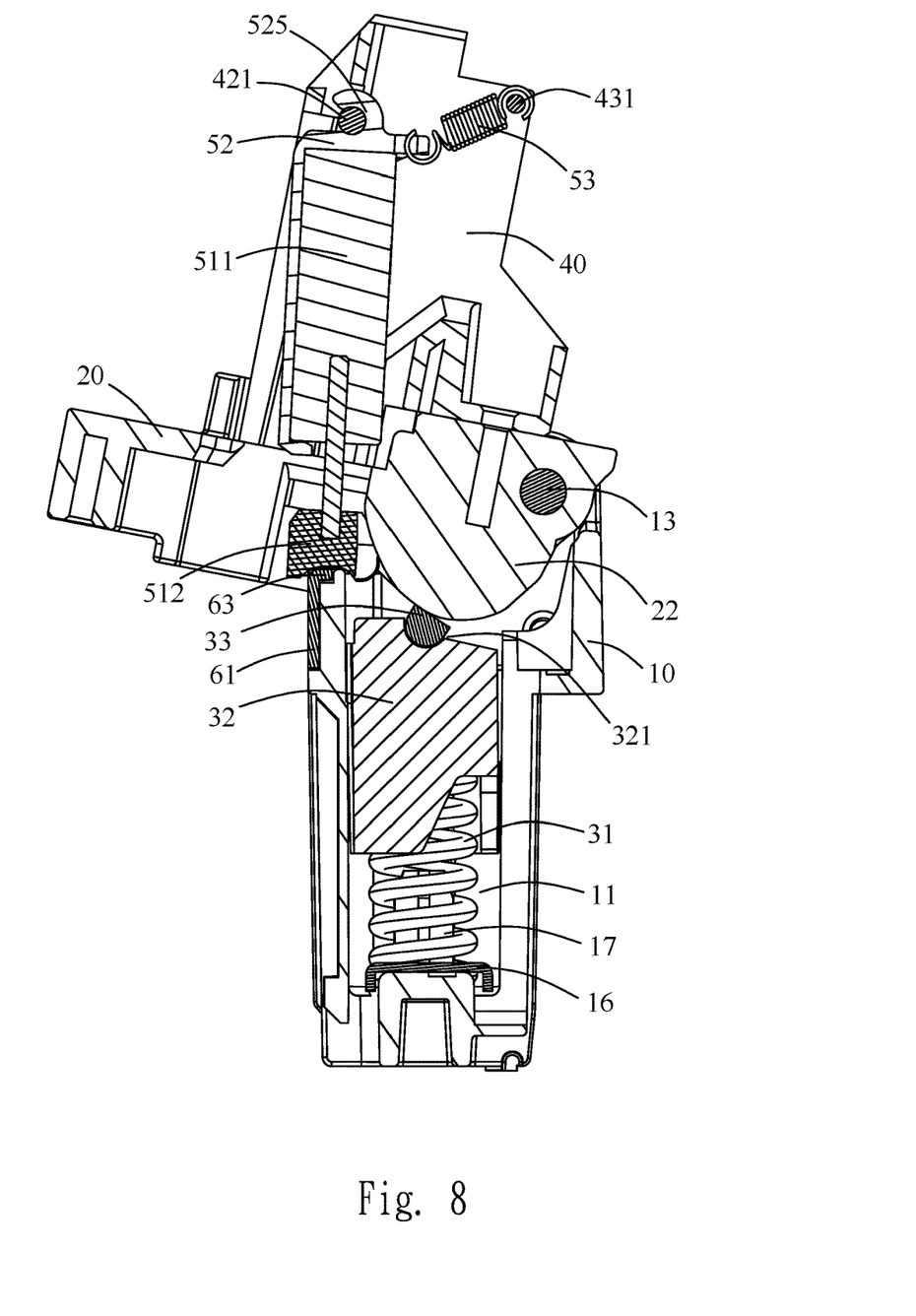
FIG. 8 shows a sectional view of the damping hinge in the second position.
Figure 9:
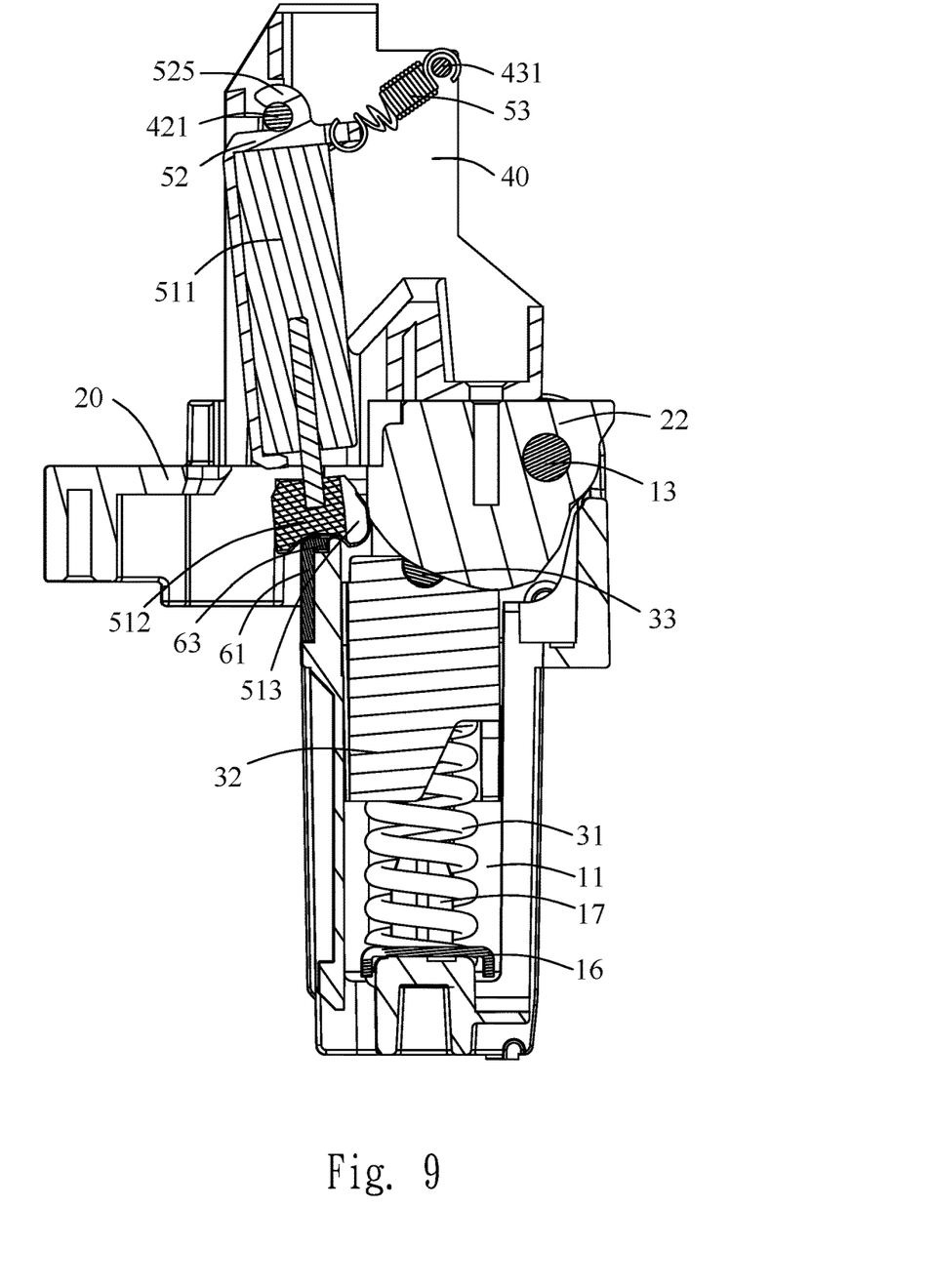
FIG. 9 shows a sectional view of the damping hinge in the third position.

Referring to FIG. 7 and FIG. 9, the first enforcement frame 60 is separated with the actuating portion 512 in the first position, and thus the motion of the upper cover is undamped and the damper core 511 is held still by the damper holder 52 and the damper spring 53. While the upper cover swings from the first position to the second position, the first enforcement frame 60 engages with the actuating portion 512 to damp the motion of the upper cover, and the damper core 511 linked with the damper holder 52 swings within the accommodating space 41 under the combining force of the damper spring 53 and the first enforcement frame 60. To be clearly, the engaging portion 63 of the first enforcement frame 60 isn't engaged with the actuating portion 512 as the upper cover is opening and bringing the revolving part 20 swinging to the first position (as shown in FIG. 7). Thus the damper spring 53 pulls the damper holder 52 to cause the actuating portion 512 of the damper 51 swinging to a first actuating position, and meanwhile, the damper 51 swings to the rear end of the opening 214 and the contacting portion 212 engages with the contacting groove 513 of the actuating portion 512. During the time that the revolving part 20 swings between the first position and the second position, the engaging portion 63 is still not engaged with the actuating portion 51. As the revolving part 20 rotates to the second position (as shown in FIG. 8), the engaging portion 63 of the first enforcement frame 60 is engaged with the actuating portion 512. As the revolving part 20 swings from the second position to the third position, the engaging portion 63 of the first enforcement frame 60 presses the actuating portion 512 to move upward, and meanwhile the damper 51 swings toward the front end of the opening 214 slightly. And during the time that the revolving part 20 swings to the third position (as shown in FIG. 9), the upper cover is fully closed and the engaging portion 63 of the first enforcement frame 60 is engaged with the actuating portion 512 to cause the damper 51 swinging to a second actuating position, meanwhile the engaging portion 63 of the first enforcement frame 60 presses the bottom surface of the first notch 211 of the revolving part 20, and the contacting portion 212 exits the contacting groove 513 of the actuating portion 512.

Referring to FIG. 2, in a preferred embodiment, the damping hinge 100 further comprises a second enforcement frame 70 made of metal, and the second enforcement frame 70 is attached within the inner space 11 of the first joining part 10. To be clearly, the second enforcement frame 70 includes a basement plate 71 and two side plates 72 extended upward and backward from two ends of the basement plate 71, a hooking hole 711 is arranged on the basement plate 71, and two hooking portions 712 are extended downward from the front and rear end of the basement plate 71. An extruding pillar 17 is arranged inside the hooking hole 711, two hooking portions 712 are hooked on the front surface and the rear surface of the extruding platform 16 separately, and both upper ends of two side plate 72 are bolted to the first joining part 10 and the first enforcement frame 60. The first enforcement frame 60 and the second enforcement frame 70 reinforce the structure strength of the damping hinge 100.

Referring to FIG. 7 to FIG. 9, the working process of the damping hinge 100 is shown below. As the upper cover is opened, the upper cover causes the revolving part 20 to swing to the first position (as shown in FIG. 7), the engaging portion 63 of the first enforcement frame 60 is not engaged with the actuating portion 512, thus the damper spring 53 pulls the damper holder 52 to assure the actuating portion 512 of the damper 51 swinging to the first actuating position, and meanwhile, the damper 51 swings to the rear end of the opening 214 and the contacting portion 212 engages with the contacting groove 513 of the actuating portion 512. In this situation, the motion of the upper cover is undamped. As the upper cover is closing, the revolving part 20 rotates from the first position to the second position (as shown in FIG. 8), the engaging portion 63 of the first enforcement frame 60 starts to engage with the actuating portion 512, and thus the motion of the upper cover is damped. As the revolving part 20 rotates to the third position (as shown in FIG. 9), the upper cover is closed, the engaging portion 63 of the first enforcement frame 60 pushes the actuating portion 512 to move upward, meanwhile the damper 51 swings from the rear end of the opening 214 toward the second actuating position located in the front end thereof, meanwhile the engaging portion 63 of the first enforcement frame 60 presses the bottom surface the first notch 211 of the revolving part 20, and the contacting portion 212 exits the contacting groove 513 of the actuating portion 512, and thus the motion of the upper cover is damped. While the upper cover is opening again, the revolving part 20 rotates from the third position to the second position (as shown in FIG. 8), and the engaging portion 63 of the first enforcement frame 60 is engaged with the actuating portion 512 to damp the motion of the upper cover. The revolving part 20 rotates from the second position to the first position (as shown in FIG. 7), the engaging portion 63 of the first enforcement frame 60 exits the actuating portion 512, the actuating portion 512 returns to the first actuating position, the damper core 511 is pulled back to its original position by the elastic force applied by the damper spring 53, and the motion of the upper cover is undamped.

As described above, during the process of opening and closing of the upper cover, the revolving part 20 rotates between the first position and the second position to cause the engaging portion 63 of the first enforcement frame 60 not to engage with the actuating portion 512, and thus the motion of the revolving part 20 is undamped. As the revolving part 20 rotates between the second position and the third position, the engaging portion 63 of the first enforcement frame 60 keeps pressing the actuating portion 512 and thus the motion of the revolving part 20 is damped. In conclusion, the damping hinge 100 in the present invention has a damper arranged within and thus the production cost and the size can be reduced, and the design of the first enforcement frame 60 and the second enforcement frame 70 reinforces the structure strength of the damping hinge 100.

What is claimed is:

1. A damping hinge comprising:
   a first joining part;
   a revolving part pivotally connected on the first joining part to pivot in a first position, a second position and a third position relative to the first joining part;
   a supporting module fastened within the first joining part for elastically pressing the revolving part to assure the revolving part and the first joining part to stay in the three positions;
   a second joining part fastened to the revolving part and having an accommodating space disposed within;
   a damping module arranged in the accommodating space and comprising a damper, a damper holder and a damper spring; the damper having a damper core fastened on the damper holder and an actuating portion which is capable of moving up and down elastically; a top of the damper holder pivotally connected on the second joining part; and the damper spring connected between the second joining part and the top of the damper holder;
   a first enforcement frame fastened on the first joining part;
   wherein, during the time that the revolving part rotates from the first position to the second position, the first enforcement frame is separated from the actuating portion so as to assure the motion of the revolving part being undamped, and the damper core being held still by the damper holder and the damper spring;
   wherein, during the time that the revolving part rotates from the second position to the third position, the first enforcement frame is engaged with the actuating portion so as to assure the motion of the revolving part being damped, and the damper holder bringing the damper core to swing in the accommodating space under an elastic force of the damper spring and a pressing force of the first enforcement frame.

2. The damping hinge as claimed in claim 1, wherein the first joining part has a first revolving hole arranged on an upper portion of the first joining part and the revolving part has a curve portion with a second revolving hole, and a revolving pin is arranged in the first revolving hole and the second revolving hole for holding the first joining part and the revolving part together to assure the first joining part and the revolving part revolving around the revolving pin.

3. The damping hinge as claimed in claim 1, wherein the revolving part comprises a part body with an upper notch disposed on an upper surface of the part body and the second joining part fastened on the revolving part, a bottom portion of the second joining part is disposed in the upper notch, and the second joining part comprises:
   a first fixing hole being disposed on two walls of a front end of an upper portion of the accommodating space for holding a first fixing pin;
   a second fixing hole being disposed on the two walls of a rear end of the upper portion of the accommodating space for holding a second fixing pin;
   the damper holder having a holder body for holding the damper core, a connecting portion extended backward from an upper portion of the connecting portion, a hook disposed on a middle section of an upper portion of the connecting portion for hooking with the first fixing pin, a connecting hole arranged on a rear end of the connecting portion, and the damper spring hooked between the second fixing pin and the connecting hole.

4. The damping hinge as claimed in claim 3, wherein the part body comprises a bottom notch disposed on a bottom surface of the part body, a contacting portion extended forward from a middle section of a rear wall of the bottom notch, and a contacting groove disposed on a rear end of the actuating portion, the contacting portion being capable to swing in or out of the contacting groove, while the revolving part rotated to the first position, the contacting portion swinging into and engaging the contacting groove, while the revolving part rotated to the second position, the contacting portion swinging out of the contacting groove.

5. The damping hinge as claimed in claim 3, wherein the holder body comprises a first holding portion extended backward from two sides of a bottom portion of the holder body, a second holding portion extended backward from the bottom portion of the holder body, and a third holding portion extended backward from a bottom portion of the connecting portion, the damper core of the damper being held still by the first holding portion, the second holding portion and the third holding portion.

6. The damping hinge as claimed in claim 1, wherein the first joining part comprising a first holding notch disposed on an outer side of the upper portion of the first joining part, a second holding notch disposed on the upper portion of an front end of the first joining part, the first enforcement frame comprising a basement, a extending portion extended backward and upward from the basement, and an engaging portion extended backward from an upper portion of the basement; the basement and the extending portion arranged in the first holding notch, the engaging portion fastened in the second holding notch.

7. The damping hinge as claimed in claim 1, wherein an accommodating space is disposed on a top surface of the first joining part, the supporting module comprises a supporting spring, a supporting body and a supporting pad, the supporting spring and the supporting body are disposed in the accommodating space of the first joining part, an elongated supporting groove being disposed on a top surface of the supporting body, a supporting spring holder being disposed on a bottom surface of the supporting body, the supporting pad being disposed in the supporting groove, the supporting spring being disposed in the supporting spring holder to press the supporting body elastically, and the supporting pad engaging with the curve portion.

8. The damping hinge as claimed in claim 7, wherein a bottom wall of the accommodating space of the first joining part has an extruding platform with an extruding pillars, the damping hinge further has a second enforcement frame with a basement plate and two side plates extended backward and upward from two sides of the basement plate, a hooking hole being arranged on the basement plate, two hooking portions being extended downward from both a front end and a rear end of the basement plate, the extruding pillow being inserted in the hooking hole, the hooking portions being hooked on a front surface and a rear surface of the extruding platform, and two upper portions of the side plates being fastened on the first joining part and the first enforcement frame.

* * * * *